United States Patent
Thomas et al.

[11] Patent Number: 5,209,073
[45] Date of Patent: May 11, 1993

[54] COOLING DEVICE AND METHOD WITH MULTIPLE COOLED CHAMBERS AND MULTIPLE EXPANSION MEANS

[75] Inventors: David A. Thomas; Ian C. McGill, both of Auckland, New Zealand

[73] Assignee: Fisher & Paykel Limited, Auckland, New Zealand

[21] Appl. No.: 784,505

[22] Filed: Oct. 31, 1991

[30] Foreign Application Priority Data

Nov. 1, 1990 [NZ] New Zealand .................. 235931

[51] Int. Cl.$^5$ ............................................ F25B 41/00
[52] U.S. Cl. .................................... 62/81; 62/180; 62/186; 62/525; 62/528; 165/22
[58] Field of Search .................. 62/180, 186, 408, 525, 62/528, 81; 165/22

[56] References Cited
U.S. PATENT DOCUMENTS 4,422,571 12/1983 Bowman ............................ 62/186
5,025,638 6/1991 Yamagishi et al. .................. 62/180

Primary Examiner—John M. Sollecito
Attorney, Agent, or Firm—Jacobson, Price, Holman & Stern

[57] ABSTRACT

A cooling device having a refrigeration chamber (1) and a freezer chamber (3), a refrigeration plant having an evaporator (15) and condenser (18), a compressor (16) and air flow passageways (5, 8, 11) for conducting air flow across the evaporator and through the refrigerator and freezer. Capillaries of different size (19, 20) control the flow of refrigerant from the condenser to the evaporator to control the temperature of the evaporator. A pressure device (36) produces the air flow through the passageways to the refrigerator and freezer. Motorized valves (30, 31) are operated by temperature sensors within the refrigerator and freezer to control the flow of air therethrough. A variable temperature compartment (4) may be provided and connected to the airflow passages, with a flow control valve (32) for maintaining a temperature therein set by the user.

20 Claims, 1 Drawing Sheet

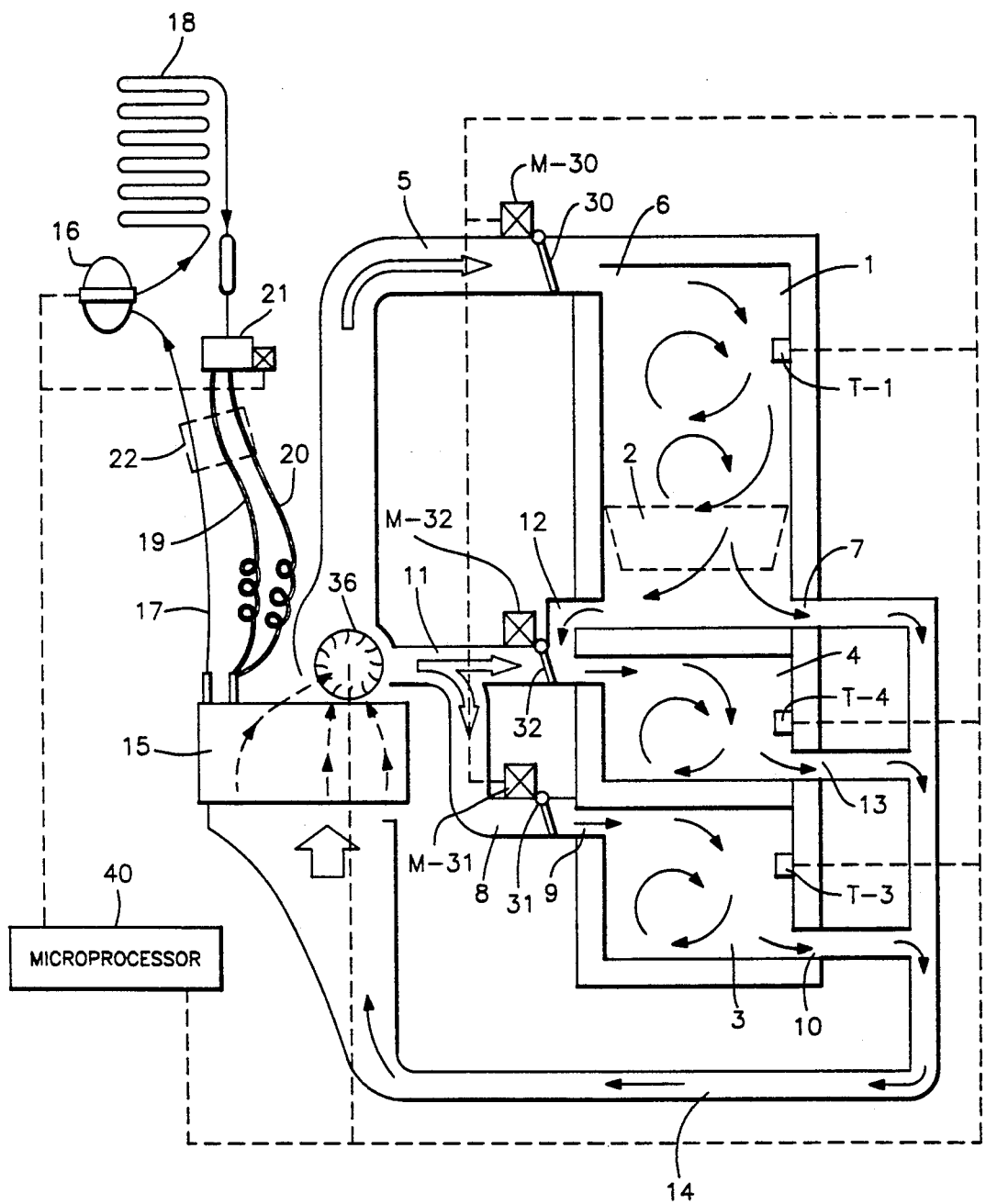

COOLING DEVICE AND METHOD WITH MULTIPLE COOLED CHAMBERS AND MULTIPLE EXPANSION MEANS

BACKGROUND OF THE INVENTION

This invention relates to a cooling device and comprises in the preferred form a combined refrigerator and freezer.

In domestic appliances such as refrigerator freezer constructions there is a tendency for the refrigerator compartment to be overcooled. This results in a reduction in the humidity in that compartment which increases tendencies for food stuffs held in the refrigerator compartment to be dried out. This tendency to overcooling also reduces the overall efficiency of the appliance. This is disadvantageous.

It is therefore an object of the present invention to provide a cooling device which will obviate or minimize the foregoing disadvantages.

BRIEF SUMMARY OF THE INVENTION

Accordingly in one aspect the invention consists in a cooling device comprising at least two chambers to be maintained substantially at selected but different temperatures, a refrigeration plant including an evaporator, an air flow passageway across said evaporator, separate air flow passageways through the at least said two chambers, said the separate air flow passageways being fed by the air flow passageway passing across the evaporator, valve means in each separate air flow passageway, selection means to determine whether any valve is to allow or prevent air flow and to select a temperature at which the evaporator is to run or at least tend towards, at least two refrigerant flow control means between the condenser and evaporator having different flow capacities, and control means to direct refrigerant flow through a selected one of the at least two flow control means, and pressure means to cause air movement in the air flow passageways.

To those skilled in the art to which the invention relates, many changes in construction and widely differing embodiments and applications of the invention will suggest themselves without departing from the scope of the invention as defined in the appended claims. The disclosures and the descriptions herein are purely illustrative and are not intended to be in any sense limiting.

BRIEF DESCRIPTION OF THE DRAWINGS

One preferred form of the invention will now be described with reference to the accompanying drawing which is a diagrammatic cross sectional view of a cooling device according the preferred form of the invention.

DETAILED DESCRIPTION

Referring to the drawing a cooling device in the preferred form comprises a combined refrigerator and freezer having at least two compartments including a refrigeration compartment 1 which may include therein a humidity compartment 2. A freezer compartment 3 is provided and in the embodiment described herein a further compartment is provided which is a variable temperature compartment 4.

Air flow passageways are provided through each compartment. Thus an air flow passageway 5 having an inlet 6 the compartment 1 is provided and an outlet 7 is provided therefrom. A separate air flow passageway 8 has an inlet 9 to the compartment 3 and an outlet 10 is provided from the compartment 3.

In the embodiment shown in the drawing the variable temperature compartment 4 is fed by a passageway 11 in the form of a branch from the air flow passageway 8 and through a passageway 12 exiting from the compartment 1. Only one air flow passageway 8 or 12 could be utilized in an alternative embodiment of the invention or the inlets to compartment 4 in other ways such as by a branch from passageway 5 could be provided. An outlet 13 is provided from the compartment 4. The outlets 7, 10 and 13 may for example meet at a common air flow passageway 14 which passes over an evaporator 15 which forms part of the refrigeration plant of the refrigerator.

Pressure means 36 is provided to move air within the various passageways and this may comprise a multiple speed fan having at least two speeds. However a single speed fan may be adequate. The evaporator 15 passes refrigerant therefrom to a compressor 16 through conduit 17 and the refrigerant passes from the compressor 16 to the condenser 18. From the condenser 18 the refrigerant passes through one of a pair of capillaries 19 and 20 of varying capillary diameters, selection of the capillary 19 or 20 through which the refrigerant will flow being made by a suitable switch 21. The conduit 17 and capillaries 19 and 20 may be linked by a heat exchanger plate 22 which may be soldered or otherwise affixed to the conduit 17 and capillaries 19 and 20.

Adjacent the entrances 6 and 9 valves 30 and 31 respectively are provided which may take the form of motor controlled flap valves controlled by motors M-30 and M-31, respectively, at entrances 6 and 9. Thus when valve 30 is closed and valve 31 is opened, air flow will be directed through compartment 3 but when valve 30 is open and valve 31 closed the air flow will be directed through compartment 1. A further similar motorized flap valve 32 controlled by motor M-32 is provided so as to be movable between positions where it closes either the air flow passageway 11 or the air flow passageway 12 so that either air is directed into chamber 4 from compartment 1 or air at substantially the same temperature as the air passing into compartment 3 is directed into compartment 4. It will be appreciated that compartment 4 is optional.

The use of the invention is as follows:

It will be appreciated that the particular order of the cycle can be varied and that a system of priorities can be developed, for example, to determine which compartment receives air should each compartment require cooling at substantially the same time.

Thus, for example, at start up the valve 31 can be opened and valve 30 closed. Thus air passing over the evaporator plate is directed to compartment 3. The switch 21 selects the more restrictive diameter capillary 19 or 20 so that the evaporator plate 15 cools to a colder temperature, for example, about minus 23° C. or a little colder so as to achieve a temperature of about minus 23° C. in the freezer compartment 3. Where a variable speed fan 36 is provided the fan is also set to the appropriate speed. Temperature sensor T-1, T-3, T-4 may be provided in each compartment, so that when the desired temperature is reached in compartment 3, for example, the valve 31 may be closed and the valve 30 opened.

When the refrigerant passes through the less restrictive diameter capillary 19 or 20, air is directed along passageway 5 to the compartment 1. The evaporator plate 15 will warm up for example to about minus 5° C. which is the desired refrigerator compartment temperature and while the evaporator 15 is warming the compressor 16 can be turned off. If the evaporator core gets too warm the compressor 16 can be turned on or if the compartment 1 reaches its desired temperature the refrigeration plant may be shut down. During the warming cycle of the evaporator plate 15 the more restrictive capillary 19 or 20 may be used and the switching over may take place when the evaporator plate 15 reaches its desired temperature. The fan speed if variable is also selected. Thus the evaporator 15 runs at or tends towards higher or lower temperatures depending on whether the capillary selected is less or more restricted in diameter.

The valve 32 is simply set to allow the chamber or compartment 4 to be substantially at the same temperature as compartment 3 or compartment 1 as selected.

If all compartments are cold enough then, if desired, cold air may be trapped with the refrigeration plant shut down until any of the compartments get too warm. The appropriate step to direct air to the compartments 1 or 3 is then repeated. Desirably the cooling device also includes a defrost cycle to thaw ice on the evaporator 15. This can be carried out from time to time through the main algorithm of, for example, a microprocessor 40 which controls the operations herein described. Alternatively it can be timed.

The compartment 4 may have special override controls, for example, for manual settings so that it can be used for example as a fast freeze compartment or can allow items taken from the colder compartment 3 to be thawed to for example about 0° C.

The cycles are repeated as necessary.

Particularly where a small refrigerator compartment 1 is provided with a larger freezer compartment 3 cold air may be trapped in the passageways when the valve 31 closes. This cold air is then directed to the refrigerator compartment 1 causing rapid cooling of this compartment and any early switch to cooling of the freezer compartment 3. This can reduce the efficiency of the construction. This may be overcome or at least minimized by increasing the heat load in the refrigerator or higher temperature compartment. This may be achieved, for example, by adding thermal mass to the refrigerator compartment 1, reducing the insulation or providing a relatively large refrigerator compartment 1 when compared to the size of the freezer compartment 3.

Thus it can be seen that at least in the preferred form of the invention a cooling device is provided which allows air of the appropriate temperature to be supplied to each compartment. This tends to minimize tendencies to dry foodstuffs at least in the refrigerator compartment as an improvement in humidity in that compartment is found. Also increases in efficiency are expected to be achieved.

We claim:

1. A cooling device comprising:
   at least two chambers selectively maintained at different temperatures;
   a refrigeration plant including an evaporator and a condenser containing refrigerant;
   an evaporator air flow passageway for conducting air flow across said evaporator;
   separate air flow passageways through said at least two chambers and connected to said evaporator airflow passageway;
   separate valve means in each separate air flow passageway for controlling the flow of air through said at least two chambers;
   temperature sensing means within at least one of said chambers;
   at least two refrigerant flow control means in said refrigerator plant between said condenser and said evaporator and having different flow capacities;
   evaporator temperature control means in said refrigerant plant for controlling flow of refrigerant through at least one of said at least two flow control means;
   pressure means for producing flow of air through said air flow passageways; and
   selection means for controlling said separate valve means to control air flow through said chambers in response to said temperature sensing means, to operate said evaporator temperature control means, and to operate said pressure means.

2. A cooling device as claimed in claim 1 wherein said at least two chambers comprise:
   a refrigerated compartment to be maintained at a refrigerator temperature;
   a freezer compartment to be maintained at a temperature colder than said refrigerator temperature; and
   a variable temperature compartment to be maintained selectively at a desired temperature by the user.

3. A cooling device as claimed in claim 2 and further comprising:
   further air flow passageways connecting said variable temperature compartment to said evaporator air flow passageway and at least one of said refrigerated compartment and freezer compartment; and
   further valve means in said further air flow passageways for controlling the air flow through said variable temperature compartment.

4. A cooling device as claimed in claim 1 and further comprising:
   a compressor in said refrigeration plant;
   a first refrigerant conduit having one end connected to an outlet of said evaporator and another end connected to an inlet of said compressor;
   a second refrigerant conduit having one end connected to an outlet of said compressor and an inlet of said condenser; and
   heat exchanger means for thermally connecting said first refrigerant conduit to at least one of said at least two refrigerant flow control means.

5. A cooling device as claimed in claim 1 and further comprising:
   defrost means for producing a defrost cycle by controlling said evaporator temperature control means for raising the temperature of said evaporator to remove ice which may have formed on the surface thereof.

6. A cooling device as claimed in claim 5 and further comprising:
   timing means for emitting a defrost signal to said evaporator temperature control means at predetermined periods depending on time elapsed since a previous defrost cycle.

7. A cooling device as claimed in claim 5 and further comprising:
   a decision making device for carrying out decisions in an algorithm for operating said refrigeration plant, said decision making device emitting a defrost signal to said evaporator temperature control means at times determined from said algorithm for initiating said defrost cycle.

8. A cooling device as claimed in claim 1 wherein:
said at least two refrigerant flow control means comprise at least two capillaries having different capillary diameters.

9. A cooling device as claimed in claim 2 wherein:
said at least two refrigerant flow control means comprise at least two capillaries having different capillary diameters.

10. A cooling device as claimed in claim 4 wherein:
said at least two refrigerant flow control means comprise at least two capillaries having different capillary diameters.

11. A cooling device as claimed in claim 6 wherein:
said at least two refrigerant flow control means comprise at least two capillaries having different capillary diameters.

12. A cooling device as claimed in claim 7 wherein:
said at least two refrigerant flow control means comprise at least two capillaries having different capillary diameters.

13. A method of controlling the temperatures of at least two chambers of a cooling device including; a refrigeration plant including an evaporator and a condenser containing refrigerant; at least two refrigerant flow control means between said condenser and said evaporator, said refrigerant flow control means having different flow capacities to control the temperature of said evaporator, and a refrigerant conduit having one end connected to said evaporator and another end connected to the inlet of a compressor, the compressor having an outlet connected to an inlet of said condenser, said conduit being thermally connected by a heat exchanger to at least one of said at least two refrigerant flow control means; evaporator temperature control means to direct refrigerant flow selectively through said at least two refrigerant flow control means; an evaporator air flow passageway across said evaporator; separate air flow passageways through said at least two chambers, said separate air flow passageways being connected to said evaporator air flow passageway, at least one of said separate air flow passageways directly connecting at least one of said at least two chambers to another of said at least two chambers; separate valve means in each of said separate air flow passageways; temperature sensing means within at least one of said chambers; and selection means for controlling said separate valve means to control flow in said chambers in response to said temperature sensing means, operating said evaporator temperature control means, and operating a pressure means operatively connected to said air flow passageways; the method comprising:
sensing the temperature within at least one of said chambers;
controlling said separate valve means to control flow of air through said chambers in response to said temperatures within at least one of said chambers;
operating said evaporator temperature control means for directing refrigerant through at least one of said refrigerant flow control means; and
operating said pressure means for moving air through said air flow passageways.

14. A method as claimed in claim 13 and further comprising:
operating said evaporator temperature control means to perform a defrost cycle whereby said refrigeration plant is operated to raise the temperature of said evaporator for removing ice formed on the surface of said evaporator.

15. A method as claimed in claim 14 and further comprising:
timing a predetermined period of time elapsed since the previous defrost cycle was carried out; and
initiating said defrost cycle by emitting a defrost signal periodically based on said elapsed time.

16. A method as claimed in claim 14 and further comprising:
initiating said defrost cycle by a defrost signal from a decision making device;
operating said decision making device for carrying out decisions in an algorithm in order to operate said refrigeration plant; and
issuing said defrost signal to said control means at times deemed required within said algorithm.

17. A method as claimed in claim 13 wherein: said at least two refrigerant flow control means comprises at least two capillaries, and said step of operating said evaporator temperature control means comprises directing refrigerant through at least one of said capillaries.

18. A method as claimed in claim 14 wherein:
said at least two refrigerant flow control means comprise at least two capillaries, and said step of operating said evaporator temperature control means comprises directing refrigerant through at least one of said capillaries.

19. A method as claimed in claim 15 wherein:
said at least two refrigerant flow control means comprise at least two capillaries, and said step of operating said evaporator temperature control means comprises directing refrigerant through at least one of said capillaries.

20. A method as claimed in claim 16 wherein:
said at least two refrigerant flow control means comprise at least two capillaries, and said step of operating said evaporator temperature control means comprises directing refrigerant through at least one of said capillaries.

* * * * *